Patented May 11, 1926.

1,584,291

UNITED STATES PATENT OFFICE.

JOHN HARRIS, OF CLEVELAND, OHIO.

GASEOUS FUEL.

No Drawing. Application filed December 6, 1923. Serial No. 678,810

This invention relates to gaseous fuels, and more particularly to a gaseous fuel which, when used in combination with oxygen, is especially adapted for the purpose of cutting metals.

It is the general object of the invention to produce a gaseous fuel which is relatively inexpensive, which will enable the cutting operation to be performed in a most efficient manner, and with the use of a gas which is ordinarily readily obtainable.

I prepare a gaseous fuel by which the foregoing general object may be realized by saturating and impregnating water gas with ordinary commercial ether. The most convenient manner in which this saturation or impregnation may be accomplished is by introducing into a cylinder containing about 200 cu. ft. of water gas, from one to two pounds of commercial ether. When the delivery valve from such a tank is opened, the water gas, impregnated with the ether, will be supplied to the blowpipe and the latter may be operated with oxygen in the usual manner.

When the ether is added to and mixed with the water gas in the manner set forth hereinbefore, the resultant gaseous fuel will consist of approximately 97½ to 95 parts by volume of such gas, to approximately 2½ to 5 parts by volume of ether vapor.

The advantage of my fuel mixture is that the ether increases the flame temperature and the heat units of the water gas. Furthermore, by reason of the fact that it lowers the igniting point of the water gas, the mixture can be used with ordinary blowpipe tips, without danger of the flame being blown off such tips, as is the case where water gas is attempted to be used without carburetion with such heavier hydrocarbon, as then tips intended for burning water gas have to be provided with special cups for the prevention of this blowing out or blowing off of the preheating flame.

By the use of my invention, the water gas can now be used with the same facility as ordinary cutting gases, but at much less cost and with greater efficiency.

Where one pound of ether is employed with a cylinder of gas, the resultant gas will realize all of the advantages set forth hereinbefore; where two pounds of ether are employed with a cylinder of gas, a corresponding increase in flame temperature and heat units will be realized, with a corresponding increase in the speed of cutting, and the igniting point will be further lowered, thus insuring the maintenance of the flame at the blowpipe tips without liability of being blown off. Furthermore, with the higher limit or larger quantity of ether, the gas is particularly useful for cutting heavy masses of metal or dirty metal with great facility.

While commercial or ethyl ether is preferred for admixture with water gas, because of its richness in carbon and hydrogen, my invention contemplates the use of methyl ether, as well, for such admixture.

While I contemplate using either carbureted water gas or blue water gas, I prefer to use the former gas, having approximately the following composition:

| | Percentage by volume. |
|---|---|
| $CO_2$ | 3 |
| Illuminants | 10 |
| $O_2$ | .5 |
| CO | 27 |
| $H_2$ | 37 |
| $CH_4$ | 17 |
| $N_2$ | 5.5 |

Having thus described my invention, what I claim is:—

A gaseous fuel particularly useful for the cutting of metal and consisting essentially of a mixture of water gas with the vapor of ether in proportions of from not materially less than 2½ to not materially more than 5 parts by volume of the ether vapor, to from not materially more than 97½ to not materially less than 95 parts by volume of the water gas.

In testimony whereof, I hereunto affix my signature.

JOHN HARRIS.